July 9, 1963  C. L. ROPPEL  3,096,952
VERTICAL TAKE OFF AIRCRAFT
Filed April 19, 1961  5 Sheets-Sheet 2
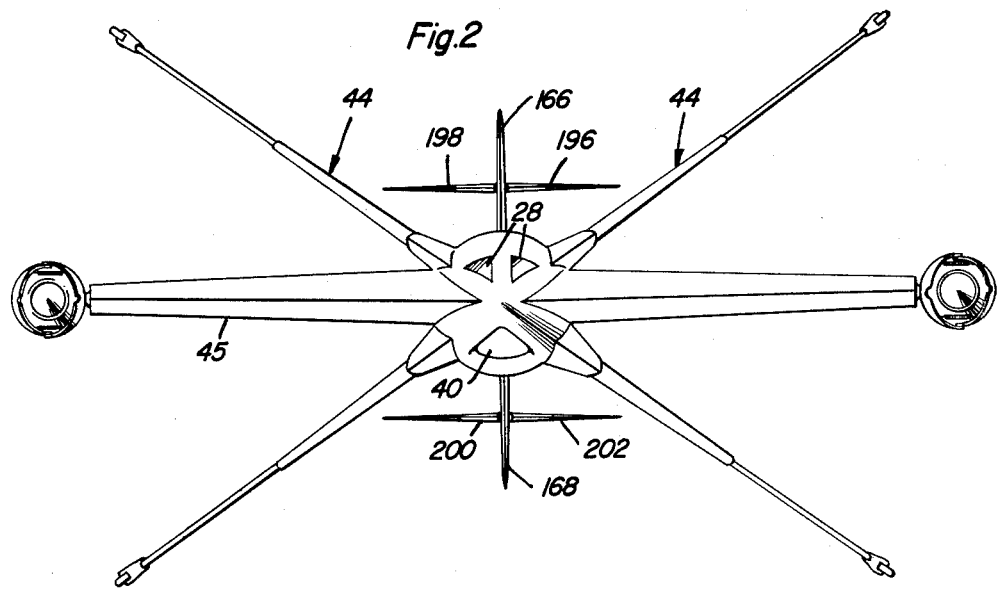
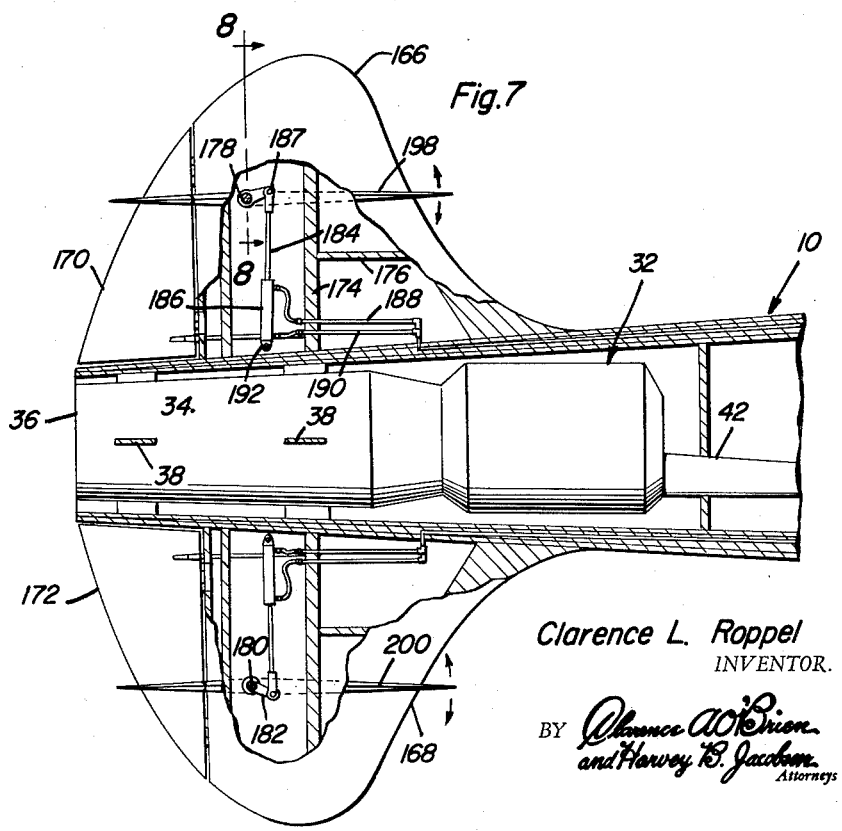
Clarence L. Roppel
INVENTOR.

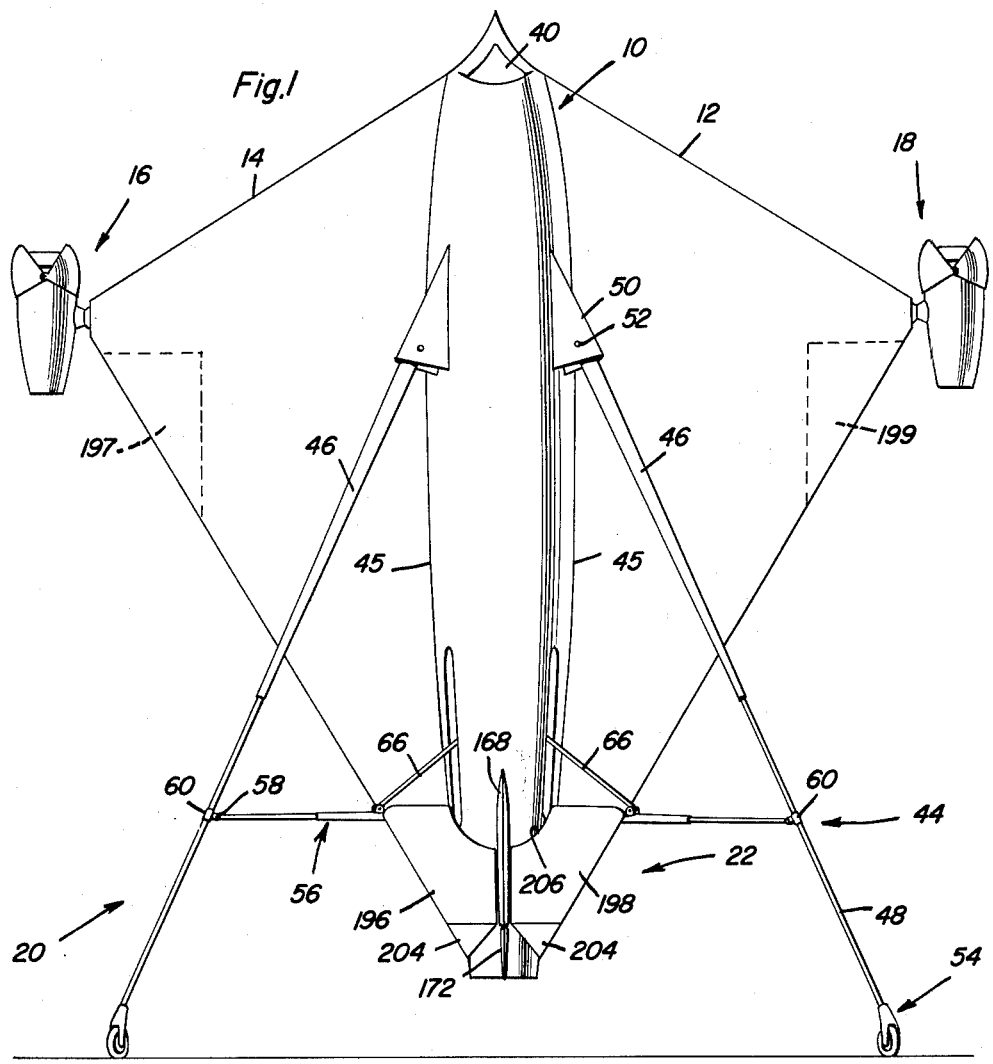

July 9, 1963
C. L. ROPPEL
3,096,952
VERTICAL TAKE OFF AIRCRAFT
Filed April 19, 1961
5 Sheets-Sheet 3
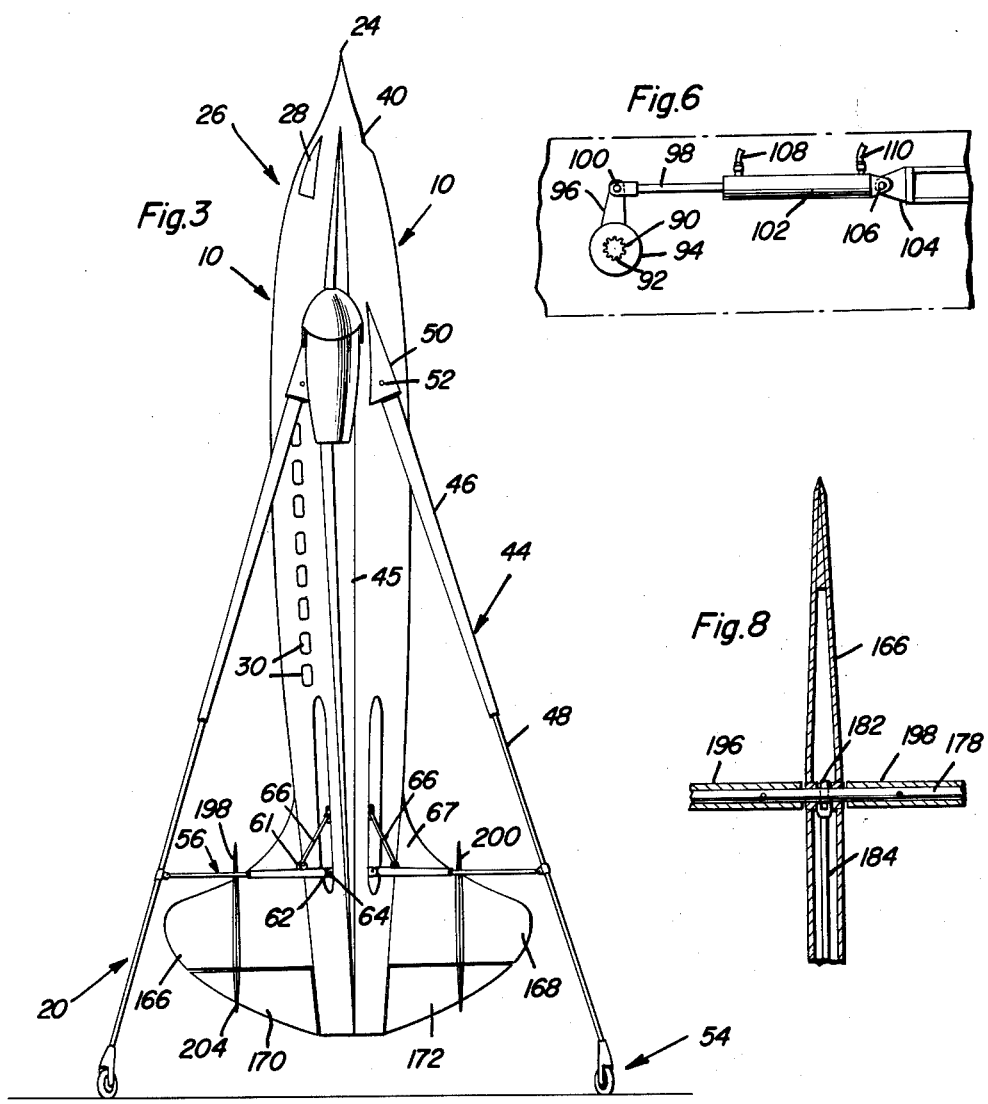

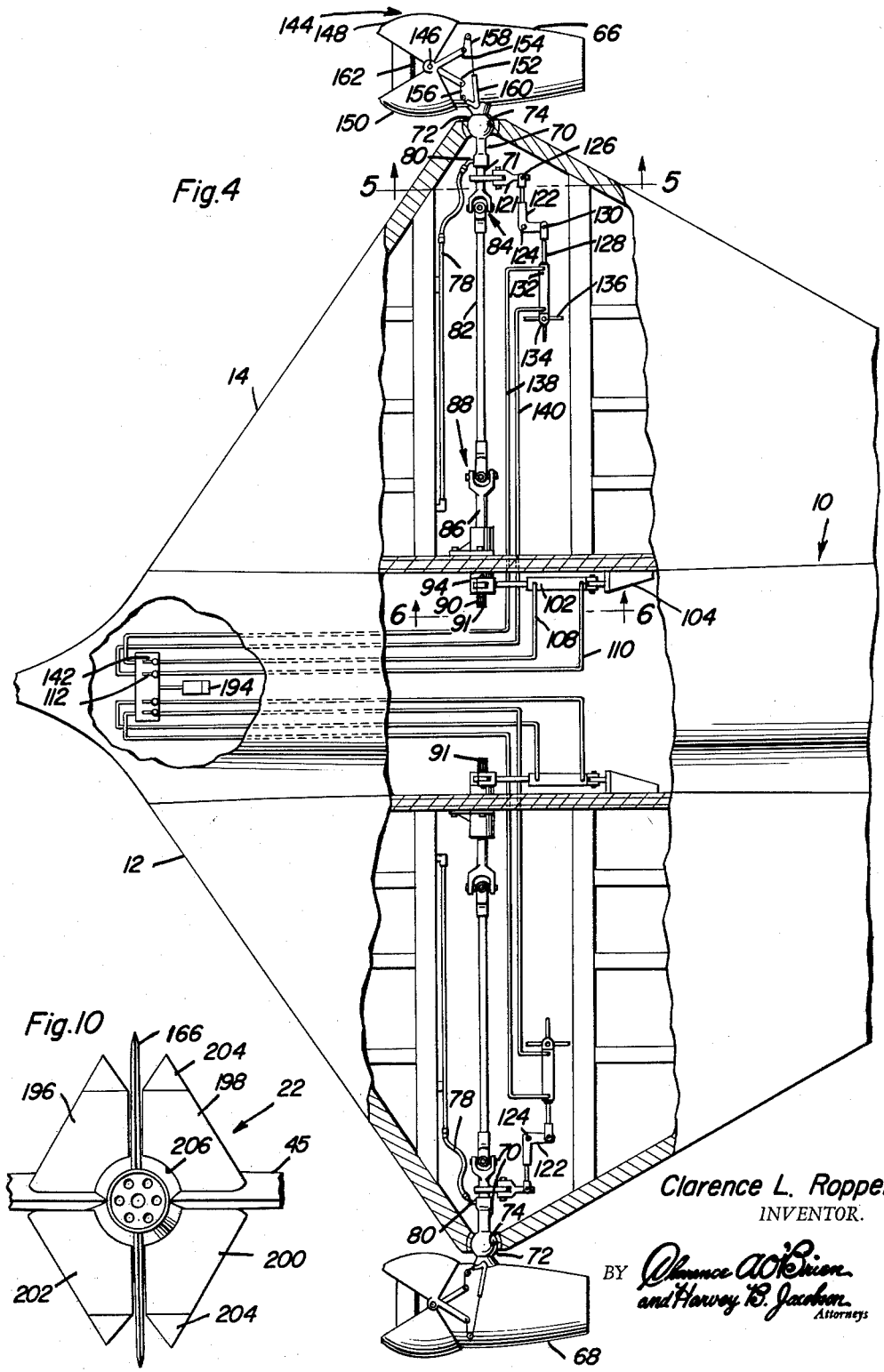

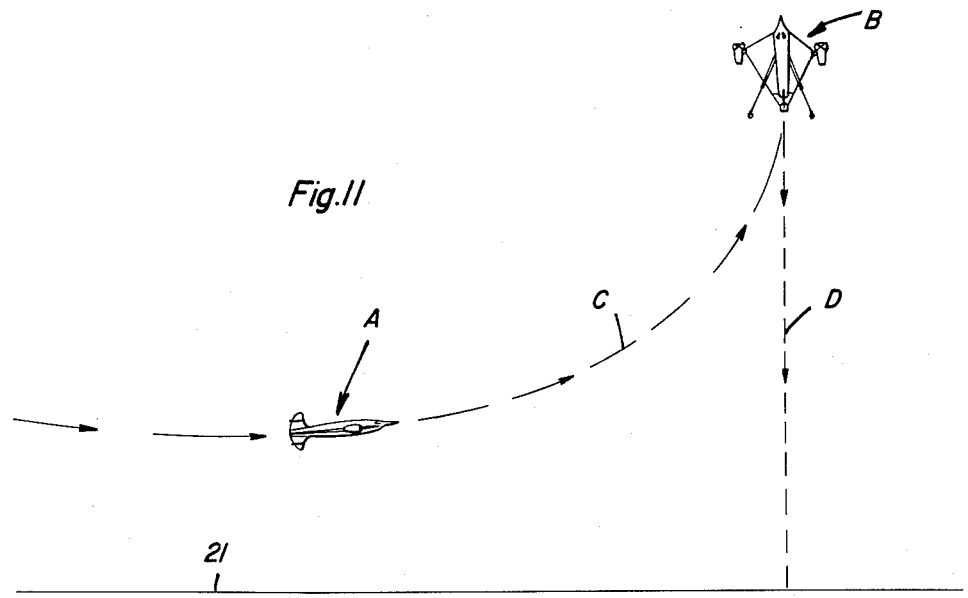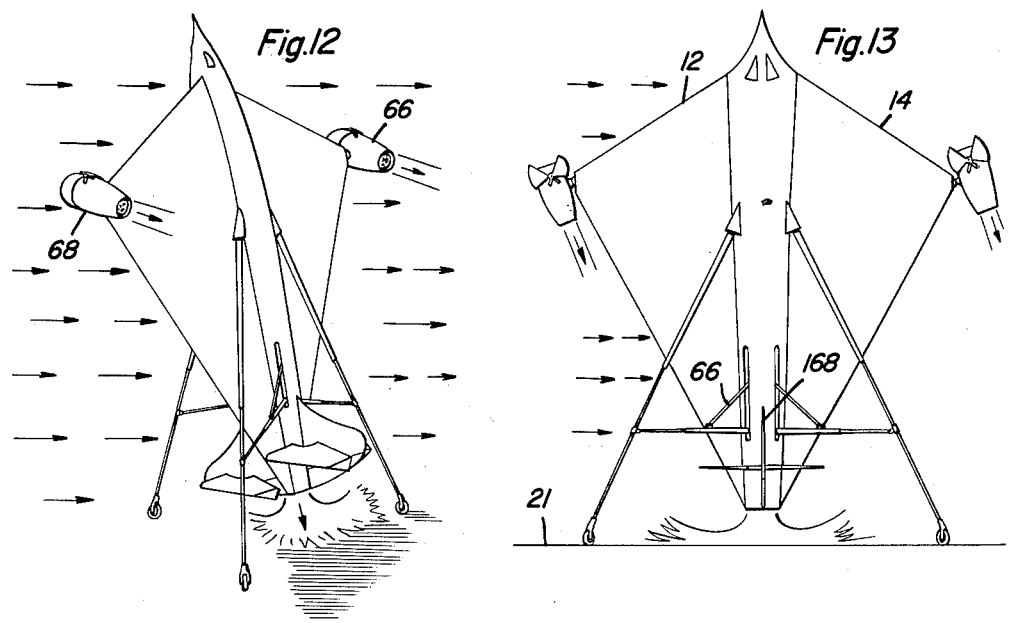

United States Patent Office 3,096,952
Patented July 9, 1963

3,096,952
VERTICAL TAKE OFF AIRCRAFT
Clarence L. Roppel, Fairdale, N. Dak.
Filed Apr. 19, 1961, Ser. No. 104,040
6 Claims. (Cl. 244—12)

This invention relates to flying machines, and more particularly to aircraft of the vertical take off type.

It is a primary object of this invention to provide a vertical take off type of aircraft with propulsion means which are mounted on universal joints so that they may be moved to change the direction of the propulsion forces so as to counteract wind effects on the aircraft and to make the aircraft more maneuverable.

It is another object of this invention to provide a novel means for moving an aircraft propulsion motor about a universal joint.

It is still another object of the invention to provide an aircraft with motors mounted in such a way that the aircraft can take off vertically, and still move sideways, forwardly or backwardly while still in the vertical position.

It is another object of the invention to provide a tail of a vertical take off type of aircraft which is so mounted and designed that it may also be used as a lift device in assisting the aircraft on take offs, and also is adapted to be used as an elevator or control surface.

It is another object of this invention to provide a device for selectively streamlining aircraft engines when idling or not functioning.

It is still another object of the invention to provide a novel landing gear for vertical take off type aircraft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view looking at the bottom of the aircraft in take off position;

FIGURE 2 is a plan view of the aircraft in take-off position;

FIGURE 3 is a side elevational view of the aircraft in take-off position;

FIGURE 4 is an enlarged plan view of the forward portion of the aircraft and partially in section;

FIGURE 5 is a vertical cross-sectional view taken substantially in the plane of line 5—5 in FIGURE 4;

FIGURE 6 is an elevational view on an enlarged scale taken substantially on the plane of line 6—6 in FIGURE 4;

FIGURE 7 is an elevational side view on an enlarged scale and partially in section of the tail of the aircraft;

FIGURE 8 is a vertical cross-sectional view taken substantially on the plane of line 8 in FIGURE 7;

FIGURE 9 is a plan view on an enlarged scale of one of the wing tip jet engines and a streamlining mechanism therefor;

FIGURE 10 is an elevational view from the rear of the aircraft showing the air brakes in fully operative braking position;

FIGURE 11 is a diagrammatic view illustrating the manner of landing the aircraft;

FIGURE 12 is a perspective view showing the manner of landing the aircraft in a wind; and FIGURE 13 is an elevational view showing the final stages of the aircraft landing in a wind.

As shown in the drawings, and particularly in FIGURES 1, 2 and 3, the aircraft comprises a fuselage 10 having a wing composed of two triangular semispans 12 and 14 secured on each side thereof. Jet engines 16 and 18 are pivotally mounted by universal joints on the outer tip of each semispan, and a landing gear assembly 20 is pivotally and retractibly mounted to the fuselage. A novel tail and air brake assembly 22 is secured to the rear part of the fuselage.

The fuselage 10 is generally cigar shaped and has a pointed nose 24. A pilot's compartment 26 is provided in the forward upper portion of the fuselage, and this compartment is provided with windshields 28. The fuselage is hollow and of conventional construction so as to provide interior room for passengers, luggage, etc. Rollers or windows 30 on each side of the fuselage are provided for the passenger compartment.

As shown in FIGURE 7, a conventional jet engine 32 is provided within the interior of the tail portion of the fuselage, and has a jet exhaust pipe 34 by which it exhausts at 36. The pipe 34 is supported by supports 38. The front part of the fuselage has an air intake opening 40 which feeds air to the jet engine 32 by means of conduits 42. The conduits 42 preferably are located in that portion of the fuselage not normally used.

The landing gear assembly 20 comprises preferably four telescoping strut assemblies 44 each composed of a forward, tapered tubular member 46 slidably receiving a smaller tubular member 48. Each member 46 terminates its forward end within a streamlined fairing 50, and is pivoted to a structural member of the fuselage at 52. The lower ends of the strut members 48 are pivotally connected to caster wheel assemblies 54. The strut members 46 preferably contain a pneumatic and hydraulic shock absorbing unit of conventional design so as to allow the members 48 to resiliently move within the members 46. Each strut member 48 is pivotally connected to the tail end of the fuselage by brace members 56 which are pivotally connected at 58 to lug members on sleeve 60 which are fixed to the strut members 48. Each brace member 56 is pivotally connected near its lower end at 62 between a pair of parallel lug members 64 projecting outwardly from the surface of the fuselage. A conventional hydraulic motor 66 of the piston cylinder type is pivotally connected between the brace members 56 and fuselage 10. Each hydraulic motor 66 is retractible into a longitudinally extending slot 68 in the surface of the fuselage.

Propulsion engines, preferably of the jet type, as shown at 66 and 68 are pivotally mounted at the outer tips of the semispans 12 and 14. Each engine or power plant 66, 68 is enclosed in a generally streamlined conventional housing of circular cross-section which is secured to a radially extending rod 70. Since both engines are mounted and operated in the same manner, a detailed description of the mounting and operating means for only one engine will be presented. The rod 70 is enlarged at 72 to form a universal ball socket which is rotatable in an arcuate recess 74 formed in the wing tip. A fuel line 78 extends from a conventional fuel tank located within the wings and connects to a passage 80 which extends through the rod 70 for feeding fuel to the engines. A drive shaft 82 is connected at its outer end to the rod 70 by conventional universal joint 84. The drive shaft extends inwardly through the wing and is connected at its inner end to a power shaft 86 by means of a second conventional universal joint 88.

The power shaft 86 is blind at its inner end as shown at 90 in FIGURES 4 and 6, and extends through a splined bore 92 in a collar 94 whereby the collar may slide axially upon the shaft, but is drivingly connected therewith in a circumferential direction. A crank arm 96 is rigidly secured to the collar 94 and extends radially upwardly therefrom as shown in FIGURE 6. A piston rod 98 of a hydraulic motor 102 is pivotally connected to the arm 96 at 100. The cylinder of the motor 102 is pivotally connected to a motor mount 104 at 106. Hydraulic pressure lines 108 and 110 extend from each end of the hydraulic motor to a selector valve in the cockpit which is controlled by the manually operated lever 112.

The outer shaft 71 of the universal joint 84 has a rearwardly extending arm 114 fixed thereto. The arm has an enlarged end 116 with an arcuate slot 118 formed therein. A yoke receives the enlarged end 116 and has a pin 120 extending through its end and through the slot 118 so as to pivotally connect the arm and yoke together. An L-shaped lever 122 is pivoted to the wing of the aircraft at its corner 124, and is pivotally connected to the rear end of the yoke 121 at 126 and to a piston rod 128 at 130. Piston rod 128 extends into a hydraulic cylinder 132 which is pivotally connected at its inner end at 134 to a motor mount 136 secured to the wing frame. The hydraulic cylinder 132 has fluid lines 138 and 140 extending to a control valve in the cockpit of the aircraft which is controlled by a lever 142.

The covering or cowling for each wing tip jet engine has a clamshell assembly 144 pivotally connected thereto on its upper and lower central surface by pivot means such as shown at 146. As shown in FIGURE 9, the clamshell assembly 144 comprises two clamshells 148 and 150. When the clamshells 148 and 150 are closed about the pivot 146 they form a generally streamlined conical nose for the cowling of the jet engine on which it is mounted. In transverse cross-section, the clamshell assembly is circular. The clamshell 148 has a lever arm 152 extending rearwardly therefrom, while the clamshell 150 has a lever 154 extending rearwardly therefrom in a like manner. The levers 152 and 154 are connected to cables 156 and 158 respectively which extend over pulleys and into tubes 160 which guide the cables through the rods 70, and into the wing of the aircraft. The cable extend from the wing into the cockpit where they are controlled by conventional means, not shown. The clamshells are normally urged together by tension springs 162, and are held apart by the cables 156 and 158. When the clamshells are closed as shown in FIGURE 9, a small hole is provided in the apex of the conical fairing formed thereby as shown at 164. The aperture 164 permits a small amount of air to go through the clamshell cowling to permit the jet engine to idle. When the clamshells are closed as shown in FIGURE 9, they provide a very effective streamlined cowling for the jet engines when they are idling or when the engines are not being used for power purposes. If desired, the clamshell operating arms 152 and 154 may be operated by a double acting hydraulic cylinder such as shown at 102 in FIGURE 6. The entire operating mechanism may be enclosed with additional cowling or fairing if desired.

The tail assembly for my aircraft comprises two vertically extending and symmetrical fins 166 and 168. Pivotally connected to the rear edges of the fins on vertical axes are two rudders 170 and 172. The fins and rudders are composed of conventional spars and ribs such as shown at 174 and 176, respectively. Control shafts 178 and 180 are rotatably journaled in the vertical fin structure and have crank arms 182 fixed to their central portions within the fin structure. The crank arms 182 extend forwardly and are pivotally connected to the piston rods 184 at 187. The other ends of the piston rods extend into cylinders 186. The cylinders 186 have hydraulic lines 188 and 190 respectively connected to their opposite ends, and the cylinders are pivoted at 192 to the frame of the fin structure. The lines 188 and 190 of the cylinder 186 extend through the fuselage of the aircraft to the cockpit where they may be controlled by conventional valve means. It is to be noted that all of the hydraulic motors disclosed for operating various parts of the aircraft are connected to a source of hydraulic pressure such as a liquid pump 194 shown in FIGURE 4. The operating shafts 178 and 180 extend through the vertical fins and project outwardly therefrom on each side of both fins as shown in FIGURE 8. As shown in FIGURE 8, the shaft 178 has symmetrical elevators 196 and 198 mounted on each end thereof, and in a like manner, the shaft 180 has elevators 200 and 202 mounted on each of its ends. Each elevator may have a trim tab 204 pivotally connected to its trailing edge. The forward inside corner of each elevator has an arcuate recess formed therein such as shown at 206 so as to permit the elevators to be pivoted inwardly towards the fuselage as shown in FIGURE 10 whereby they function as air brakes or take off assisting devices. As can be seen by an inspection of FIGURE 7, the upper and lower elevators are generally symmetrical and are operated by identical mechanisms.

When the aircraft is resting on the ground, the landing gear 20 is spread outwardly as shown in FIGURE 1 so as to properly support the aircraft on the ground surface 21. All of the jet engines are started in the conventional manner. The four elevators 196, 198, 200 and 202 are rotated by the hydraulic motors 186 until they are all coplanar as shown in FIGURE 10 and in FIGURE 13. FIGURE 13 shows the aircraft resting on the ground with its engines operating, and the prevailing wind coming from one side of the aircraft. To take the aircraft off of the ground in a vertical direction, the pilot applies power to all of the engines, particularly the central engine 32 located in the rear of the fuselage as shown in FIGURE 7. The gases ejected from the central tail pipe cause a pressure buildup between the ground surface 21 and the lower surfaces of the coplanar elevators. This pressure produces a lifting effect which urges the aircraft in the upward direction. Also, as shown in FIGURE 13 the gases ejecting from the central engine are deflected upwardly from the ground, whereby they strike the undersurfaces of the horizontally extending elevators to further assist in lifting the aircraft from the ground. The aircraft is preferably faced sideways to the prevailing wind so that the wind will not directly strike the large wing surfaces, thereby tending to tilt the aircraft. As the pilot applies power to the engines, the aircraft rises vertically from the ground, however, the prevailing wind, indicated by the horizontal arrows in FIGURES 12 and 13, tends to tilt the aircraft and cause it to drift with the wind. To prevent the aircraft from tilting and from drifting with the wind until it reaches a safe altitude, the two wing tip engines 66 and 68 are tilted forwardly by means of the hydraulic motors 102 which are controlled by the pilot by means of the control levers 112. As the motors tilt forwardly, they produce a rearward thrust which counter-reacts the drifting force of the wind. This tends to maintain the aircraft stationary in a horizontal direction so as to prevent drifting.

To tilt the engines 66 and 68 about the horizontal axis of the shaft 52 when the aircraft is flying in straight and level flight, the pilot energizes the motor 102 by means of the pressure lines 108 and 110 so as to either tilt the engines upwardly or downwardly when he pushes or pulls the levers 112. When the motors 102 are energized, they rotate the shafts 86, 82, 71 and 70 by means of the crank arm 96 and the universal joints 88 and 84. The motors may be simultaneously or individually rotated about a vertical axis extending through the center of the ball joint member 72 by energizing the hydraulic motors 132 by means of lines 138 and 140 and the selected pushing or pulling of the operating levers 142. Energization of the motors 132 causes cranks 122 to pivot about the pivot point 124 so as to pull the inner end of rod 70 backwardly or push it forwardly so as to cause the rear end of the motors to pivot inwardly or outwardly with respect to the wings. As the rod members 70 swing about a vertical axis, the universal joints 84 and 88 permit relative movement between the shaft members 71, 82 and 86. As the inner end of the rod member 70 moves out of alignment with the shaft member 82, the power shaft 86 is pulled outwardly toward the wing tips. However, since the inner end of the shaft 86 is splined, it may freely slide within the collar 94. A pin 91 extending through the extreme inner end of the shaft 86 prevents excess inward movement of the collar 94.

In normal flight, the upper elevators 196 and 198 and the lower elevators 202 and 200 are maintained horizontal and in parallel relationship as shown in FIGURE 2. These elevators function as control surfaces and are operated to move simultaneously in the same direction so that they will always remain parallel to one another during normal flight.

When the jet engines on the wing tips are operating, the clamshells 148 and 150 are maintained in their open position as illustrated in FIGURE 1 so as to permit adequate air intake for the jet engines.

FIGURES 11 through 13 illustrate the manner of landing the aircraft. During normal straight and level flight as indicated at A, the aircraft is controlled in a conventional manner by the rudders 170 and 172, and the elevators 196, 198, 200 and 202 which are maintained in a horizontal position. Since roll of the aircraft may be controlled by tilting the engines 66 and 68 about their horizontal axes, it is not necessary to provide ailerons as is conventional practice. However, if desired, elevators may be provided on the wing tips for additional control as indicated in dotted lines in FIGURE 1 at 197 and 199.

To land the aircraft, reference is made to FIGURE 11. The aircraft is first brought down close to the ground surface 21 as indicated in position A. The trailing edges of the elevators are then tilted upwardly so as to force the aircraft into a sharp climbing position until the aircraft eventually stalls as indicated at B. If necessary, the engines are throttled back to permit the aircraft to stall. Once the aircraft reaches stalling speed, the movable airfoil control surfaces become ineffective. At this point, the four elevators are operated to the coplanar position as indicated in FIGURE 10. Power is reduced so as to allow the aircraft to gradually settle downwardly towards the earth, whereupon the horizontally extending coplanar elevators function as an air brake to control the speed of descent. As the aircraft approaches the earth as shown in FIGURE 12, it may be caused to drift by a wind as indicated by the horizontal arrows. To minimize drifting, it is desirable to rotate the aircraft about a vertical axis so that the wind is parallel to the surfaces of the wing, as illustrated in FIGURE 13. This is accomplished by tilting the exhaust of the engine 68 upwardly and rearwardly as shown in FIGURE 12 so as to apply a component of thrust which is normal to the upper wing surface. This causes the aircraft to rotate in a clockwise direction as viewed in plan. Once the aircraft becomes properly aligned with the wind, the pilot may lower the exhaust of the engine 68 to prevent further rotation of the aircraft. As shown in FIGURE 13, the wings are properly aligned with the wind so as to cause minimum drifting effect on the aircraft. However, the wind blowing against the fuselage will still tend to drift the aircraft slightly. To counteract this, and to prevent all drifting, the exhaust jets of the engines are moved slightly to the right as viewed in FIGURE 13 so as to produce a component of thrust which counteracts the drifting force of the wind. This causes the aircraft to maintain a stationary position relative to the ground so that it may be landed safely. Also, once the aircraft contacts the ground it may be prevented from moving by properly orientating the engines 66 and 68. Also, by tilting the engines 66 and 68 as desired, the pilot may move the aircraft horizontally while it is on the ground as indicated in FIGURE 13, or while it is actually flying in a vertical position as indicated in FIGURE 12. Since the engines may be actually rotated or tilted in any direction, it is readily apparent that the engines may be used as a supplementary control for the airfoil surfaces during high speed flight, and also, the movement of these engines provides positive control in any direction when the aircraft is hovering in a vertical position or when it is resting on the ground.

During normal horizontal flight, the landing gear assembly 20 is retracted by energizing the four hydraulic motors 66 so as to pivot the brace members 56 forwardly on their pivot points 62. Since the sleeves 60 are fixed to the strut members 48, the strut members 48 are telescoped within the strut members 46 to shorten the landing gear. This may be facilitated, if desired, by pumping the hydraulic fluid from the strut members 56 to a storage container within the aircraft. As the brace members 56 pivot towards the nose of the aircraft, the hydraulic motors gradually recede into the recesses 69. Also, the brace members 56 in struts 44 are moved towards the fuselage until they eventually are retained in the corners 45 formed between the joint of the wing roots and the fuselage. If desired, recesses may be provided in the fuselage for completely receiving all of the landing gear strut members.

The center of gravity of the aircraft is preferably located behind the wing tip engines 66 and 68 so as to increase the stability of the aircraft when it is in the vertical position as illustrated in FIGURES 12 and 13.

As shown in FIGURE 10, the pivot axes 178 and 180 for the elevators extend substantially through the centers of the areas of the elevators so that the air forces tending to rotate the elevators about these axes will be balanced. However, the axes are slightly off center so as to reduce the vibration of the elevators.

The triangular semispans 12 and 14 comprising the wing 45 are designed to produce a small amount of drag, but have a relatively large area to provide sufficient lift to support the aircraft at extremely high altitudes and to give it a shallow glide angle with power off. Due to the short span and large chord of the wing, it is extremely strong, and permits the aircraft to fly at high speeds in turbulent weather without danger of structural failure.

While only the fuel line 78 has been illustrated as extending through each hollow rod or tube 70 to each engine, it is apparent that other supply and control devices as oil lines, fuel supply controls, etc. may also extend through each rod 70 in a similar manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An aircraft comprising a fuselage, wing semispans projecting outwardly from each side of the fuselage, propulsion means pivotally connected to each semispan by universal joint means, power means connected to the propulsion means for tilting the propulsion means in any direction about said universal joint means with respect to said semispans for controlling the aircraft, said propulsion means comprising jet engines pivotally connected to the tips of said semispans, said jet engines each having its intake provided with a pair of power operated clamshells where the intake may be selectively closed and streamlined by said clamshells.

2. A device as recited in claim 1 wherein said clamshells are provided with an aperture when closed to permit idling of said engines.

3. An aircraft comprising a fuselage, wing semispans projecting outwardly from each side of the fuselage, propulsion means pivotally connected to each semispan by universal joint means, power means connected to the propulsion means for tilting the propulsion means in any direction about said universal joint means with respect to said semispans for controlling the aircraft, said fuselage having at least one elevator pivotally connected to its rear portion, other power means connected between said elevator and fuselage for tilting said elevators for controlling said aircraft about its pitch axis, said elevators being substantially aerodynamically balanced about their pivots and are movable to a position by said other power means whereby they are perpendicular to the roll axis of the aircraft.

4. An aircraft comprising a fuselage, wing semispans projecting outwardly from each side of the fuselage, propulsion means connected to said aircraft for propelling it forwardly, fin means projecting from the rear of the aircraft in a direction generally normal to the planes of said semispans, stabilizer means pivotally mounted on said fin means about an axis generally parallel to the pitch axis of the aircraft, power means for oscillating said stabilizer means about said axis and being arranged so as to rotate said stabilizer means about said axis from a position parallel to said semispans to a position normal thereto, said stabilzer means comprising two airfoils mounted on two of said axes spaced from and parallel to each other, one of said airfoils mounted above the fuselage and the other below the fuselage.

5. A device as defined in claim 4 wherein said propulsion means includes a jet engine in said fuselage exhausting through a duct extending between said airfoils whereby the airfoils may be moved to a coplanar position during vertical take off to provide a lifting force.

6. An aircraft comprising a fuselage, wing semispans projecting outwardly from each side of the fuselage, propulsion means pivotally connected to each semispan by universal joint means, power means connected to the propulsion means for tilting the propulsion means in any direction about said universal joint means with respect to said semispans for controlling the aircraft, fin means projecting from the rear of the aircraft in a direction generally normal to the planes of said semispans, stabilizer means pivotally mounted on said fin means about an axis generally parallel to the pitch axis of the aircraft, power means for oscillating said stabilizer means about said axis and being arranged so as to rotate said stabilizer means about said axis from a position parallel to said semispans to a position normal thereto.

References Cited in the file of this patent
UNITED STATES PATENTS

| | | |
|---|---|---|
| 984,270 | Friedel | Feb. 14, 1911 |
| 1,859,306 | Loening | May 24, 1932 |
| 2,160,455 | De Rouge | May 30, 1939 |
| 2,735,264 | Jewett | Feb. 21, 1956 |
| 2,859,003 | Servanty | Nov. 4, 1958 |
| 2,926,868 | Taylor | Mar. 1, 1960 |
| 3,031,157 | Varden | Apr. 24, 1962 |